United States Patent [19]

Foley et al.

[11] Patent Number: 5,761,539
[45] Date of Patent: Jun. 2, 1998

[54] CENTRALLY LOCATED CAMERA INTERMEDIATE A PLURALITY OF PHOTOGRAPHIC ENVIRONMENTS

[75] Inventors: Paul M. Foley, North Andover; John W. Lynch, Melrose; Donald E. Mauchan, Marlboro, all of Mass.

[73] Assignee: Polaroid Corporation, Cambridge, Mass.

[21] Appl. No.: 565,761

[22] Filed: Nov. 30, 1995

[51] Int. Cl.⁶ ............................................ G03B 15/00
[52] U.S. Cl. .......................... 396/1; 396/428; 396/661; 396/429
[58] Field of Search ............................ 354/81, 467, 290; 396/1, 419, 427, 428, 661, 429

[56] References Cited

U.S. PATENT DOCUMENTS 2,668,472   2/1954   Lierley ................................ 88/16
3,322,487   5/1967   Renner ............................... 352/89
5,289,091   2/1994   Wada ................................ 318/282
5,341,184   8/1994   Kephart ............................. 345/62
5,531,645   7/1996   Collins .............................. 354/290

FOREIGN PATENT DOCUMENTS 3-130738   6/1991   Japan ................................ 354/467

*Primary Examiner*—David M. Gray
*Attorney, Agent, or Firm*—Leslie Payne

[57] ABSTRACT

A coin operated camera is mounted on a pedestal intermediate a plurality of children's rides. The camera may be rotated about a vertical axis to align with any of the rides to allow a photograph to be taken of the ride and any associated persons or apparatus.

1 Claim, 2 Drawing Sheets

CENTRALLY LOCATED CAMERA INTERMEDIATE A PLURALITY OF PHOTOGRAPHIC ENVIRONMENTS

BACKGROUND OF THE INVENTION

1. Field of the Invention

This invention relates to a pedestal mounted camera constructed to rotate about a vertical axis to focus on various photographic environments located equidistant from the axis of vertical rotation.

2. Description of the Prior Art

Providing photo opportunities for individuals who wish to record pleasant moments is a desirable thing. Photographers continually take pictures of each other or their children at work or play. The inventive concept herein arose from seeing parents take photographs of children on certain coin operated rides, such as seen at many retail outlets in shopping malls and the like. This led to the idea of having a centrally located camera, rotatable to align with a plurality of children's rides, all located equally distance from the camera, at various locations around a generally circular path surrounding the camera.

A patent to Lierley, No. 2,668,472, discloses a camera mounted in a fixed position and focused in a particular direction to take motion pictures of events on a sound stage. The environment embodied by the sound stage is changeable by having a plurality of sets or environments built on a circular platform. The camera is mounted radially outwardly of the circular platform. To have a different environment photographed by the stationary camera, the circular platform is rotated until the desirable environment is before the camera. The platform then stops, and the scene is shot for a length of time as desired.

A patent to Renner, No. 3,322,487, describes a camera mounted on a horizontal shelf, supported by an upstanding vertical column. The shelf may be adjusted upwardly and downwardly on the column by disclosed apparatus and horizontally on the shelf by other apparatus. The vertically extending shaft is supported on a set of casters which allows the camera support to be wheeled from one location to another or rotated in one spot, if desired.

A patent to Wada, No. 5,289,091, discloses a stationary camera designed to rotate about a vertical axis to scan a geographic area in response to programmed or manual direction, as desired. Two embodiments of the camera show that the lens may be aligned along an axis perpendicular to the vertical axis of the shaft supporting the camera, or the camera may be offset to one side and still perform its desired function.

A patent to Kephart, No. 5,341,184, discloses a camera mounted on a four wheeled cart. The camera is vertically adjustable on the cart as desired, and the wheels allow the camera to be moved at the whim of the user to align the axis of the lens with the subject to be photographed.

SUMMARY OF THE INVENTION

In this invention a plurality of photographic environments are arranged in a generally circular pattern around a vertical axis on a generally level surface. In the preferred embodiment, these photographic environments comprise children's coin operated rides such as, horses, airplanes, boats, automobiles and the like. At the center of this set of photographic environments is a camera of fixed focal length. The focal length comprises the distance between the lens and the center of the photographic environment, which in the case of children's rides, is about where the child is sitting. In other words, about the center of the head of the child to be photographed.

By arranging the seats of the children's rides at a particular distance from the lens of the camera, there is no need to refocus the camera between each exposure. All one need do is rotate the camera about a vertical axis until the camera lens is aligned with the subject to be photographed.

The camera may be mounted on a pedestal rotatable about the vertical axis and supporting the camera in proper location. The pedestal may have indexing means built into it or designed on it by various indicia to allow the operator of the camera to have it properly aligned with the subject to be photographed.

Often, parents who wish to take such charming photographs of their children do not have cameras available for the spontaneous events. Accordingly, the camera provided by this invention is available for those individuals desiring such photographs and it is intended that the camera be "coin operated". As used in this application, the term "coin operated" is intended to incorporate the use of coins or paper currency.

In the preferred embodiment, the camera rotates while the photographic environments remain stationary (except for the slight up and down or back and forth motions which may be built into each children's ride).

An alternative embodiment might allow the camera to be stationary while focused in one direction and a carrousel of various photograph environments might be moved in a circular path into a desired location.

It will also be recognized that photographic environments may not be limited to children but could certainly include adults. An example might be where a camera is mounted behind a famous bar, hotel lobby or the like, where the subject of the photograph selects his own environment, indexes the camera to the proper location where it is focused to the specific focal length desired and then actuates the camera by whatever mechanism.

In order to be sure that the camera is properly aligned with the subject to be photographed, a visual alignment tool may be secured to the camera housing or the pedestal structure, such that, the person taking the photograph can visually observe the alignment. Whether or not the alignment mechanism is vertically spaced from the axis of the camera or is offset to one side or the other, or whether the camera is offset to one side or the other of the vertical axis, is irrelevant for purposes of this invention, so long as a viewing tube or the like is available.

Objects of the invention not clear from the above description will become clear upon a review of the drawings and the description of the preferred embodiments which follow.

DESCRIPTION OF THE PREFERRED EMBODIMENTS

Figure 1:
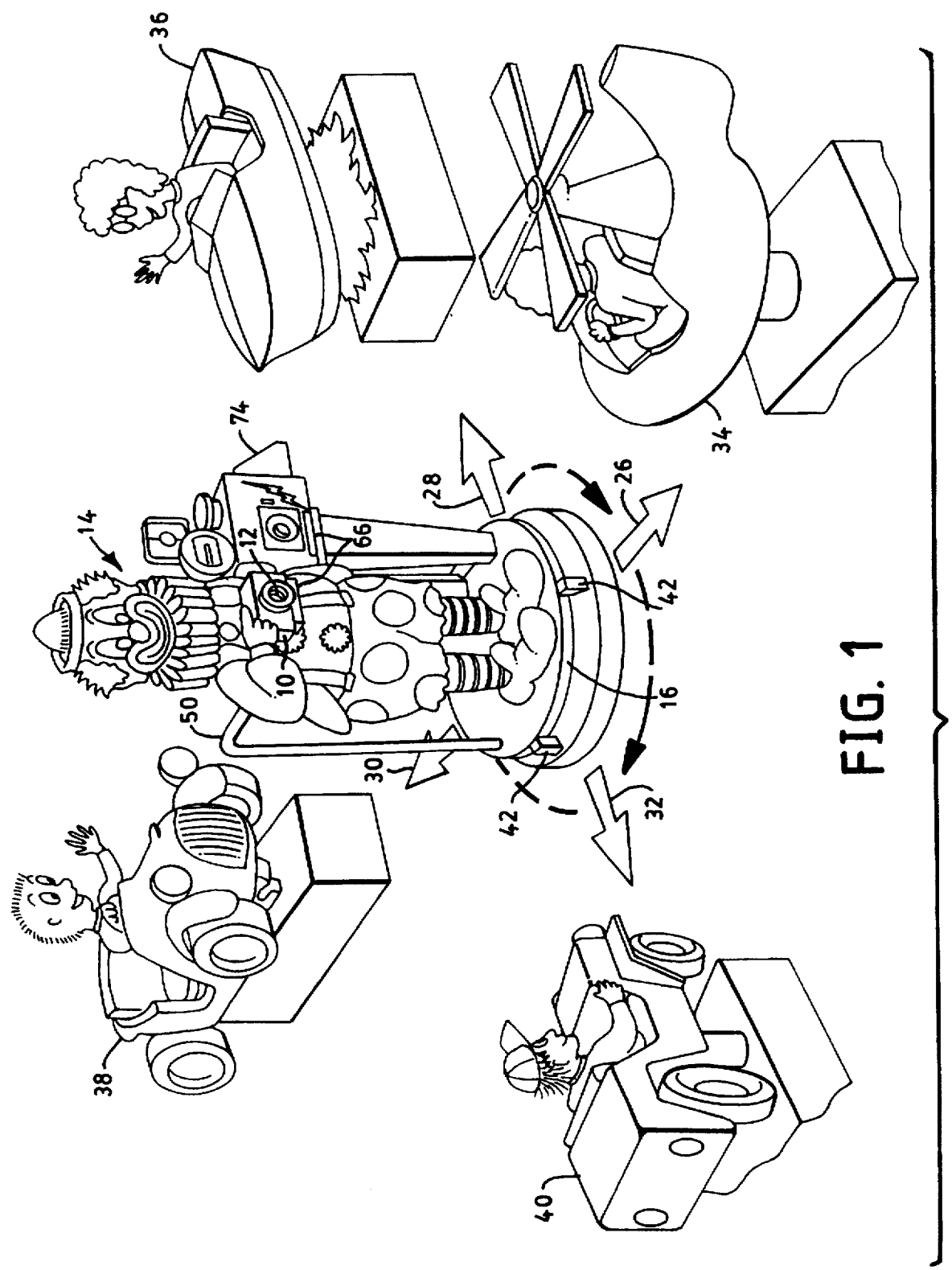
FIG. 1 is a perspective view of a camera mounted on a pedestal in the form of a clown and structured to rotate about a vertical axis to focus on various photographic environments located around the camera.

FIG. 1 is a perspective view of the general environment in which this invention functions. It includes a camera 10 having a lens 12 being held by a statue 14. In this case, the statue is in the form of a clown and it appears that the clown is taking the picture. In fact, the clown-statue is a part of a pedestal best seen from a functional standpoint in FIG. 2.

The pedestal is supported on a base 1 6 which rotates in a horizontal plane about a vertical axis 18 which extends centrally through a support disc 20.

Figure 2:
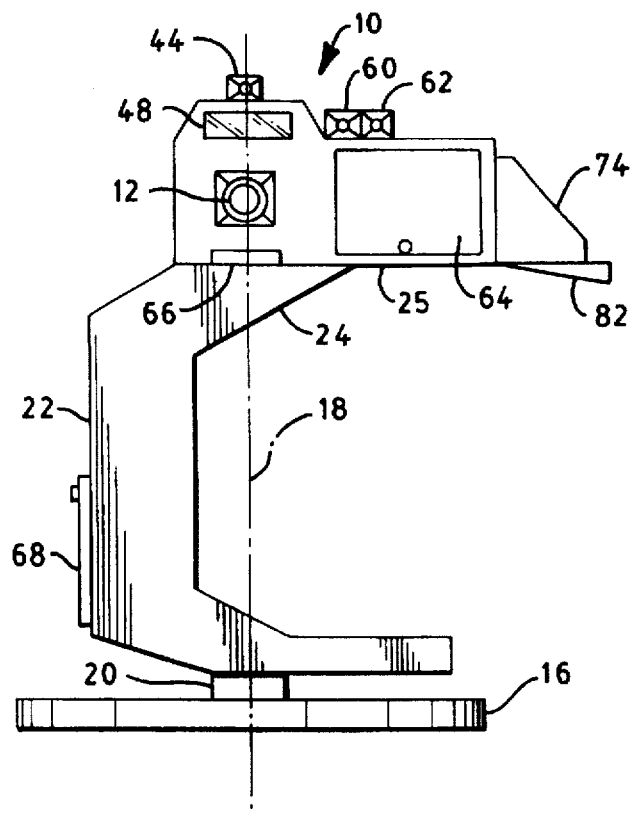
FIG. 2 is a side elevational view of a camera according to FIG. 1 with an alternative pedestal support structure.

Looking to FIG. 2. mounted on support disc 20 is a generally C-shaped support arm 22. The support arm is shaped as it is, to provide a weight balance generally equal on each side of axis 18. The upper section 24 of the arm 22 supports a shelf 25 on which camera 10 is mounted. Proper weight balance about axis 18 minimizes wear on the apparatus, generally, and minimizes the possibility of misalignment of the lens 12 in the camera with respect to the photographic environments to be recorded.

Figure 4:
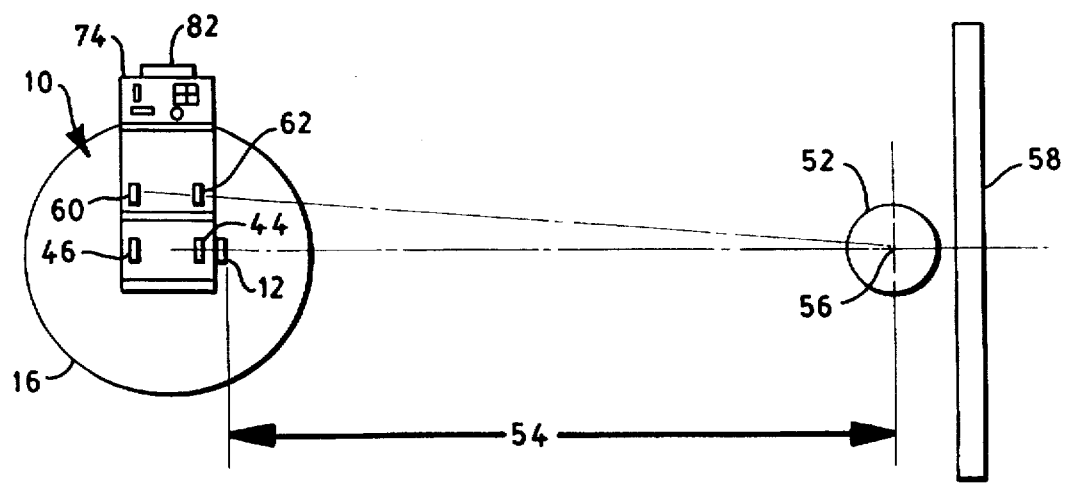
FIG. 4 is a top plan view of the camera of FIG. 2 focused on a specific subject.

It will be observed in FIG. 2 that lens 12 is vertically aligned with the axis 18 of the pedestal. An observation of FIG. 4 shows that the optical axis of the lens 12 is also aligned generally perpendicular to axis 18. This is a preferred embodiment but it is not required. The lens 12 may be offset from vertical axis 18 to one side or the other, and all that is required to accommodate the offset is a slight angular adjustment of the camera lens, to have it properly focused on the subject to be photographed.

Looking again to FIG. 1, the camera 10 may be rotated or indexed to any one of four locations 26, 28, 30, 32 which show in the drawing as arrows pointing to children's rides, namely, an airplane 34, a boat 36, a racing car 38, and a all-terrain vehicle 40. In indexing to the appropriate location, one may use the arrows 26, 28, 30, 32, and appropriate lugs 42, to gauge the alignment. Detents under base 16 (not shown) may be used as an alternative, as may many other types of alignment mechanisms, all of which are within the inventive concept herein.

As an alternative mechanism for gauging alignment, a sight tube or spaced plates 44, 46 with a hole therethrough (as best seen in FIGS. 2 and 4) are aligned on top of the camera 10, above lens 12 and above a flash 48. This allows one who is taking a photograph, to get behind the camera, as for example, by using the support bar 50 as seen in FIG. 1, to climb up behind the statue 14 and sight through openings in plates 44, 46 to gauge the proper location of the head 52 of the individual to be photographed. As indicated earlier, the lens 12 is focused at a specific location which is a specified distance 54 between the lens and the center 56 of the photographic environment to be recorded on film. The illustration in FIG. 4, shows a background panel 58, which may or may not be used.

Also shown in FIGS. 2 and 4, are a pair of offset plates 60, 62, which are aligned with the center 56. This indicates that the camera and/or the alignment plates or tubes may be offset on the support shoulder or shelf 25 of the C-shaped support arm 22, if desired.

It is intended that the camera of this invention use film units of the self-developing type, which may be mounted in the camera through a door 64 in a cassette having 150 to 300 film units per cassette. This is well known in the industry and need not be described.

Where self-developing type film units are used in camera 10, the photograph is taken and the developed picture is discharged through a slot 66. It will be observed that two slots 66 are illustrated in FIG. 1, and either location is appropriate. It makes no difference to the operation of the camera where the picture is discharged and the structure for discharging the developed photograph is not a part of this invention, but it is well known in the industry. What is not well known is the provision of a stationary camera having a fixed lens focus which develops and discharges finished photographs and then discharges the residue of the developing process and film unit into a trash receptical or cavity. The preferred receptical is formed within the C-shaped arm 22, or the body of the clown 14, illustrated in FIG. 1. FIG. 2, illustrates a panel 68 which may be removed to collect the accumulated residue from time to time.

In operation, the camera and associated equipment are assembled and lens 12 is properly focused. Adjustment of the focus of lens 12 is available in this invention, but it is not intended that the focus be changed after the lens has been set initially. The object is to have the environment set up so that the distance 54 to the center 56 of each of the photographic environments 34, 36, 38, 40 is essentially the same. Thereafter, there is no need to refocus. Similarly, the structure of this invention allows vertical and/or angular adjustment of the lens and/or camera as needed at the outset, but after the initial adjustments are made, it is anticipated that others will be unnecessary, except for periodic minor adjustments and maintenance which will be done by maintenance personnel and will not be done in the normal course of events by one taking the photograph.

In summary, the camera 10 is mounted on shelf 25 and adjusted as to focus, vertical elevation and angular inclination in a vertical plane where it remains fixed during normal operations; the allowable adjustments during installation allow for a variety of different conditions and operating parameters.

After a desired environmental location is selected by the photographer, the camera may be actuated by pressing a button or actuator 72 located on a panel 74 projecting from the right hand side of the film cassette housing, as illustrated in FIG. 2.

Figure 3:
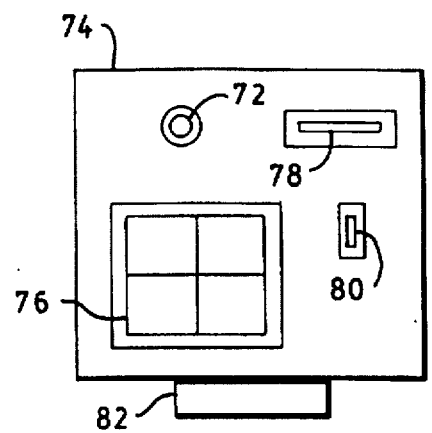
FIG. 3 is a side elevational view of the currency insert slots and camera operating buttons.

FIG. 3 shows the face of panel 74 and it includes a display panel 76 to allow the photographer to select the number of photographs he may choose, or other selection options may be available. To place actuation button 72 in active or operable condition the photographer inserts paper currency through slot 78 or coin slot 80 into a receptacle (not shown). Change may be returned through a chute 82.

Having described the invention in its preferred embodiments, it will be clear to those having skill in the art that certain changes may be made to the described structure and procedural steps without departing from the spirit of the invention. Accordingly, it is not intended that the structure illustrated in the drawings, nor the words used to describe the invention, be limiting on the invention. Rather, it is intended that the invention be limited only by the scope of the appended claims.

We claim:

1. In combination, a camera and a plurality of photograph environments comprising:

said camera having a lens;

each of said photograph environments having a center, each said center being located a specific distance from said camera lens when said camera faces toward one of said environments;

said camera lens being focused at said center;

said camera being mounted on a pedestal, said pedestal and camera being rotatable about a stationary vertical axis;

each said centers being located a uniform distance from said vertical axis;

indexing structure associated with said pedestal to direct said camera lens toward said center of each photographic environment, one photographic environment at a time;

a camera actuator to initiate a photographic picture taking sequence;

a receptacle to receive money prior to a time said actuator becomes operable;

said camera holds film units of the instant developing type.

a container mounted to rotate with said pedestal, said container being in communication with said camera to receive disposable residue of said film units after development;

wherein at least some of said photographic environments comprise a riding type toy for people;

said lens is vertically aligned with said axis; and, an externally mounted viewfinder to confirm desired alignment between said camera lens and one of said centers.

\* \* \* \* \*